United States Patent

[11] 3,598,116

[72] Inventors Joseph C. Peters
East Hartford;
Hermann Ziermann, Cheshire, both of, Conn.

[21] Appl. No. 834,005
[22] Filed June 17, 1969
[45] Patented Aug. 10, 1971
[73] Assignee United Aircraft Corporation
East Hartford, Conn.

[54] RESPIRATOR WITH FLUID AMPLIFIERS
8 Claims, 2 Drawing Figs.

[52] U.S. Cl. .......... 128/145.5, 137/81.5
[51] Int. Cl. .......... A62b 7/04
[50] Field of Search .......... 128/DIG. 10, 145.5, 145.6, 145.7, 145.8; 137/81.5

[56] References Cited
UNITED STATES PATENTS

| | | | |
|---|---|---|---|
| 3,362,404 | 1/1968 | Beasley | 128/145.8 |
| 3,429,249 | 2/1969 | Furlong | 137/81.5 X |
| 3,463,178 | 8/1969 | Kirchmier | 137/81.5 |
| 3,465,752 | 9/1969 | Brychta | 128/145.8 |
| 3,494,357 | 2/1970 | Kimball | 128/145.6 |

*Primary Examiner*—Richard A. Gaudet
*Assistant Examiner*—G. F. Dunne
*Attorney*—Norman Friedland

ABSTRACT: An on-off inhalation valve of a respirator for admitting fluid to the lungs of a patient is controlled by a flip-flop fluid amplifier driven by a fluid amplifier during the exhalation cycle and by another fluid amplifier during the inhalation cycle.

PATENTED AUG 10 1971

3,598,116

INVENTORS
HERMANN ZIERMANN
JOSEPH C. PETERS
BY Norman Friedland
ATTORNEY

RESPIRATOR WITH FLUID AMPLIFIERS

CROSS-REFERENCES TO RELATED APPLICATIONS

This application relates to an application filed on even date entitled "Respirator with Fluid Amplifiers with Fluid Timer" by H. Ziermann and J. C. Peters Ser. No. 834,004, filed on June 17, 1969 and assigned to the same assignee and constitutes an improvement of application Ser. No. 715,344 filed by Leo G. Foxwell, James E. Smith and Herman Ziermann on Mar. 22, 1968, entitled "Respirator Using Pure Fluid Amplifier," also assigned to the same assignee.

BACKGROUND OF THE INVENTION

This invention relates to a respirator utilizing fluid amplifier logic circuitry to control or assist respiration.

The above-mentioned application, Ser. No. 715,344, describes and claims a fluid amplifier controlled respiration system which utilizes a fluid amplifier to actuate a valve open and close for communicating a source of fluid, such as air and/or oxygen, to the lungs of the patient. In the Ser. No. 715,344 application, supra, a fluid amplifier is used to apply actuating pressure for opening of closing the valve for the entire breathing cycle while also being utilized to sense the parameter for causing the valve to move when in the transition from inspiration to expiration and expiration to inspiration. We have found that we can obtain a more satisfactory control in the sense that it improves accuracy and repeatability by providing separate fluid amplifiers for accomplishing the switching, namely, by providing an OR/NOR amplifier for switching from exhalation to inhalation and an inhibited OR amplifier for switching from inhalation to exhalation.

SUMMARY OF INVENTION

A primary object of the present invention is to provide an improved fluid amplifier driven respirator.

In accordance with the present invention a flip-flop amplifier is utilized to drive an on-off valve adapted to direct pressurized fluid to the lungs of the patient and an inhibited OR fluid amplifier for controlling the switching of the flip-flop fluid amplifier for the exhalation regime and an OR/NOR fluid amplifier for switching the flip-flop amplifier for the inhalation regime of the breathing cycle.

Other features and advantages will be apparent from the specification and claims and from the accompanying drawings which illustrate an embodiment of the invention.

DESCRIPTION OF THE PREFERRED EMBODIMENT

Figures 1, 2:
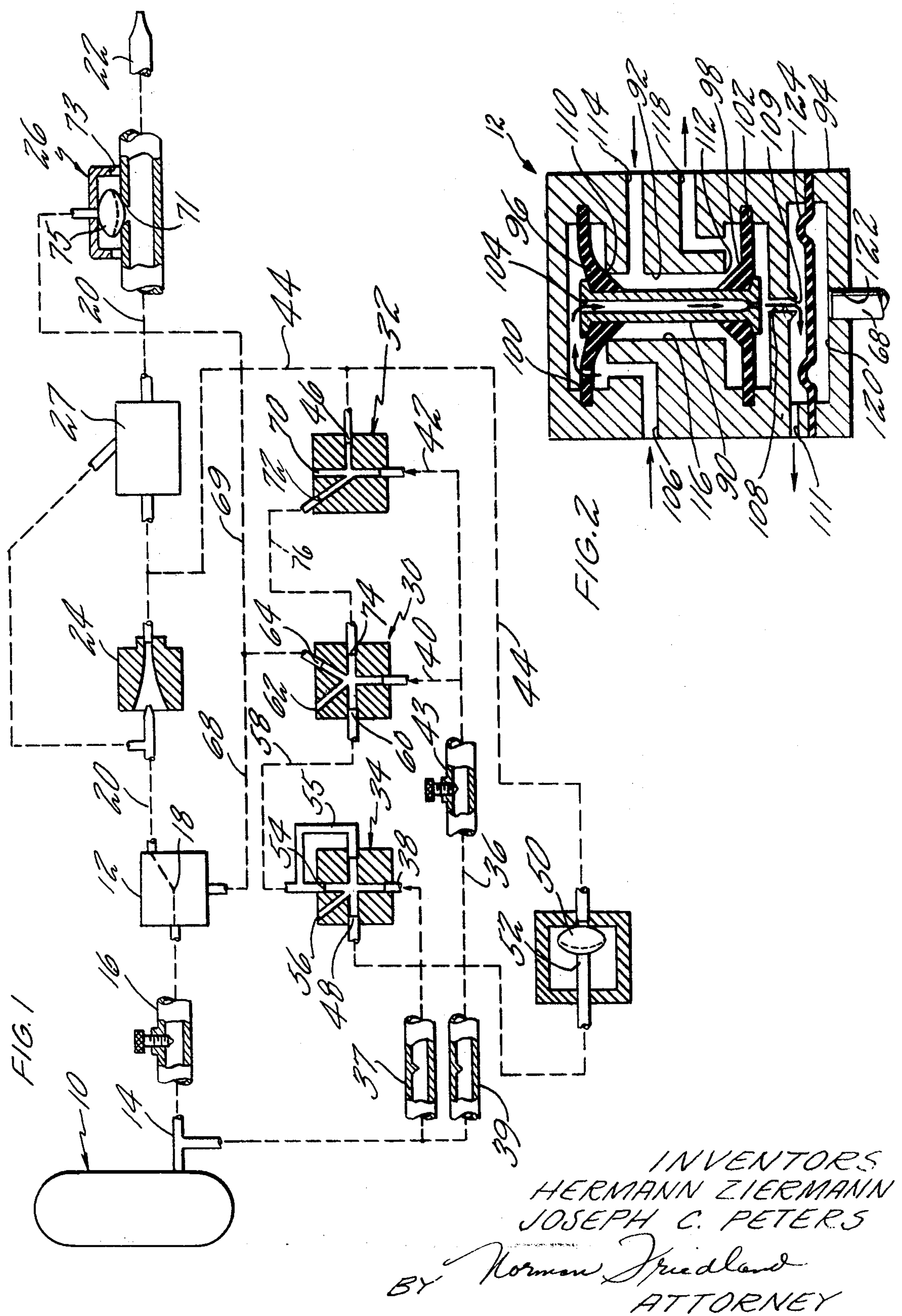
FIG. 1 is a schematic illustration of the invention.
FIG. 2 is a view and side elevation, partly in section showing the details of the inhalation control valve.

Referring now to FIGS. 1–2, the invention can best be understood by considering the invention as being made up of two circuits: (1) the flow circuit for leading air or oxygen to the lungs of the patient and discharging the air expelled from the lungs of the patient, and (2) the fluid-amplifying logic circuitry for effectuating the switching from the inhalation and exhalation regimes of the breathing cycle. As noted from FIG. 1, air or oxygen from a source generally illustrated by reference numeral 10 is supplied to the normally closed on-off inhalation valve 12 through line 14. A suitable flow control valve 16 for adjusting the flow may be used if desired. During the inhalation cycle fluid entering inhalation valve 12, previously actuated to the opened position, is ported to lines 18 and 20 where it is directed to the lungs of the patient schematically illustrated by numeral 22. It is customary to include an ejector 24 which serves to increase the volume of air delivered to the patient. For the sake of convenience and since the ejector does not form a part of the invention, the details are omitted herefrom. Normally opened exhalation valve 26 previously actuated to its closed position ( i.e. closed to ambient) is disposed in line 20 between the ejector and the lungs of the patient. When in the exhalation cycle, inhalation valve 12 is turned on the off position and exhalation valve 26 is automatically moved to the open position for discharging the fluid exhumed from the lungs of the patient to ambient.

A nebulizer generally illustrated by numeral 27 may be utilized if necessary or desirable and is driven by the fluid evidenced in line 20 upstream of the ejector 24. A suitable nebulizer may be of the type shown in patent U.S. Pat. No. 3,379,194 granted to H. Ziermann on Apr. 23, 1968. It is noted that the nebulizer in this instance will only operate when valve 12 is in the on position. Thus, it only operates during the inhalation cycle and is turned off during the exhalation cycle, assuring that no medication is lost when the patient is exhaling.

Referring next to the logic circuitry which serves to sense certain parameters for switching the inhalation and exhalation valves in a certain time relationship for defining the exhalation to inhalation ratio. The logic circuitry for controlling the switching of the inhalation and exhalation valves is comprised of basically three fluid amplifiers, primary fluid amplifier generally illustrated by numeral 30, exhalation control fluid amplifier 32 and inhalation control fluid amplifier 34. Preferably, fluid amplifier 30 is a flip-flop type where the flow from the power stream has no preference to either output channels and requires some means such as pressure or flow at the control ports to effectuate switching. Fluid amplifier 32 is the OR type and fluid amplifier 34 is an OR/NOR type. As is known, the OR and NOR types of fluid amplifiers are defined by the fact that the power stream attaches to one output channel until a signal (a positive pressure in case of an OR and negative pressure in case of a NOR) causes it to switch.

The power stream to the three fluid amplifiers is connected to source 10 by supply line 36 by way of branch lines 38, 40 and 42. Since the pressure in the supply line is generally higher than is necessary for driving the fluid amplifiers, it may be reduced. For the fluid amplifier 34 stepdown restriction 37 serves to lower the pressure to say 2 p.s.i.g. Stepdown restriction 39 is disposed in line 36 downstream of branch line 38 and serves to reduce the supply pressure to said 15 p.s.i.g. As As it may be desirable to control the switching pressure, pressure control valve 43 preferably operating over a range of 3 to 17 p.s.i.g. is disposed just upstream of branch lines 40 and 42.

Sensing line 44 preferably connected to the mouthpiece of the respirator, although it may be located anywhere that is indicative of lung conditions, is connected to control port 46 of fluid amplifier 32 and indirectly to control port 48 of fluid amplifier 34. As was mentioned above, the fluid amplifier 34 is an OR/NOR type and switches at a negative or near negative pressure signal. It has been found that this device with biased OR/NOR gate increases sensitivity particularly in the negative pressure regimes.

Looking at the operation of the logic circuitry, during the inhalation cycle when a small inspiration effort is made, the volume of air in line 44 is reduced to a negative pressure. This loss in pressure deflates valve 50, which normally closes off orifice 52, causing a loss of pressure in control port 48 increasing the pressure drop across the splitter and hence diverting the output of fluid amplifier 34 from output channel 54 to output channel 56. A constant bias, as evidenced by line 55 connecting the interaction region, increases switching sensitivity. Since output channel 56 is connected to control port 60 of the flip-flop fluid amplifier 30 by line 58, the flow from the power nozzle in line 40 is diverted from the output channel 62 to output channel 64. This flow is then divided so that a portion is admitted to valve 12 through line 68 for effectuating the opening thereof and the other portion is admitted to exhalation valve 26 by line 69 inflating balloon 75 seating it against seat 71 and preventing escapement of air to ambient through bleed ports 73. Hence, fluid from the main supply line will flow unrestricted to the mouthpiece. When a set pressure is reached in the lungs, this pressure is sensed through line 44 to port 46 causing the power stream to be diverted from the output channel 70 to the output channel 72 where it is directed to the control port 74 of the flip-flop amplifier 30 by way of line 76. This causes the output stream in the output channel 64 to divert to channel 62 where it discharges to ambient. The release of the pressure in lines 64 and 68 will permit the normally closed inhalation valve 12 to close and the normally opened inhalation valve 26 to open; thus, the flow exhuming from the patient's lungs will pass through the exhalation valve and dumped into ambient.

Normally closed inhalation valve 12 may be of the type shown in FIG. 2 which comprises valve spool 90 disposed in central bore 92 formed in casing 94. Valve spool 90 carries at either end poppet valve elements 96 and 98 each of which carry extensions 100 and 102 respectively made of flexible material that attaches to the wall of bore 92. Drilled passage 104 formed centrally of spool 90 communicates line 14 (FIG. 1) to ambient by way of drilled passages 106, 104, 108, orifices 107 and 109 , and bleed 111. As can be seen the pressure acting on the bottom of poppet 96 urges spool 90 in an upward direction seating poppet 96 against seat 110 and displacing poppet 98 away from seat 112. This permits any backflow in line 20 (FIG. 1) to escape to ambient by way of drilled passage 114, annular space 116 and drilled passage 118.

To open valve 12, control pressure in line 68 (FIG. 1) is admitted into chamber 120 through port 122 and acts across the upper face of diaphragm 124. This forces diaphragm 124 downwardly to seat against orifice 109 blocking off flow in drilled passage 104 and consequently permitting a buildup of pressure between orifices 107 and 109. This pressure acts across the upper face of poppet 98 urging spool 90 downwardly urging poppet 98 to bear against seat 118 and displacing poppet 96 away from seat 110. The downward position of spool 90 communicates line 14 with line 20 by way of drilled passage 106, annular space 116 and drilled passage 114.

It should be understood that the invention is not limited to the particular embodiments shown and described herein, but that various changes and modifications may be made without departing from the spirit or scope of this novel concept as defined by the following claims.

We claim:

1. A fluidic-controlled respirator having a source of fluid, a conduit including delivery means connected to said source for filling the lungs of a patient including a normally closed valve for blocking off the flow of the fluid in said conduit and a normally opened valve in said conduit for interconnecting the lungs to ambient, a. means for intermittently and synchronously opening said normally closed valve and closing said normally opened valve, 1. said means including a first fluid amplifier having an output channel for directing actuating pressure to said normally closed and normally opened valve for effectuating opening and closing thereof respectively,
2. a second fluid amplifier having an output channel connected to a control port of said first fluid amplifier,
3. a third fluid amplifier having an output channel connected to another control port of said first fluid amplifier, and
4. means responsive to the breathing of said patient for controlling said second and third fluid amplifier whereby said first amplifier intermittently opens and closes said normally closed valve and said normally opened valve.

2. A fluidic-controlled respirator as claimed in claim 1 including an ejector disposed between said normally opened valve and said normally closed valve.

3. A fluidic-controlled respirator as claimed in claim 1 including a nebulizer disposed downstream of said normally opened valve.

4. A fluidic-controlled respirator as claimed in claim 2 including adjustable means for regulating the flow of fluid admitted to the lungs of the patient disposed upstream of said ejector.

5. A fluidic-controlled respirator as claimed in claim 1 including adjustable means for regulating the pressure level required to switch flow from one output channel to the other output channel of said first fluid amplifier, said last-mentioned means being disposed in proximity to the power stream of said first fluid amplifier.

6. A fluidic-controlled respirator as claimed in claim 1 wherein said first fluid amplifier is a flip-flop type such that the power stream has no preference to either output channels.

7. A fluidic-controlled respirator as claimed in claim 1 wherein said second and third fluid amplifiers are the type where the fluid from the power stream normally is directed to a preferred output channel.

8. A fluidic-controlled respirator as claimed in claim 1 including a balloon type element having its interior exposed to pressure in the lungs of the patient for closing an orifice in communication with the control port of said third fluid amplifier.